United States Patent [19]

Bolkestein et al.

[11] Patent Number: 5,438,917
[45] Date of Patent: Aug. 8, 1995

[54] DEVICE FOR RIPENING FRUIT

[75] Inventors: Jacobus Bolkestein; Cornelis Bolkestein, both of Rotterdam, Netherlands

[73] Assignee: Binair Groep B.V., Moerkapell, Netherlands

[21] Appl. No.: 135,729

[22] Filed: Oct. 13, 1993

[30] Foreign Application Priority Data

Oct. 13, 1992 [NL] Netherlands ............ 9201778

[51] Int. Cl.⁶ .................. A23B 7/144; A23L 1/00; A23L 3/00; A23N 15/06
[52] U.S. Cl. .................. 99/476; 99/467; 99/474
[58] Field of Search .......... 99/467, 468, 473–477, 99/480, 483, 485, 516, 536; 426/263, 418, 419

[56] References Cited

U.S. PATENT DOCUMENTS

| | | | |
|---|---|---|---|
| 1,817,875 | 8/1931 | Broadbent . | |
| 2,278,571 | 4/1942 | Skinner . | |
| 4,676,152 | 6/1987 | Tsuji et al. | 99/468 |
| 4,779,524 | 10/1988 | Wade | 99/476 |
| 4,824,685 | 4/1989 | Bianco | 99/474 |
| 5,203,256 | 4/1993 | Meuller | 99/475 |

FOREIGN PATENT DOCUMENTS

| | | |
|---|---|---|
| 2651645 | 2/1938 | France . |
| 2119997 | 11/1972 | Germany ............ 99/467 |
| 75526 | 3/1954 | Netherlands . |
| 6504987 | 8/1966 | Netherlands . |
| 479233 | 2/1938 | United Kingdom . |
| 9101094 | 2/1991 | WIPO . |

Primary Examiner—Timothy F. Simone
Attorney, Agent, or Firm—Handal & Morofsky

[57] ABSTRACT

The invention relates to a method for ripening fruit, such as bananas, and a device fop carrying out the method. According to the invention, a fluid is cooled and guided along the fruit by circulation means conveying said fluid through a load of fruit placed on a pallet, the load being sealed essentially in an airtight manner in the peripheral direction, and the load being placed above or below the circulation means, while the fluid is conveyed through the load essentially in the vertical direction by the circulation means. The circulation means preferably suck the fluid up through the load from the bottom or down through the load from the top, and then guide it along the cooling means, following which, as the result of a pressure difference caused by the circulation means, the fluid is conveyed again along the outside of the load to the bottom or top side, respectively, thereof.

24 Claims, 1 Drawing Sheet

U.S. Patent   Aug. 8, 1995   5,438,917
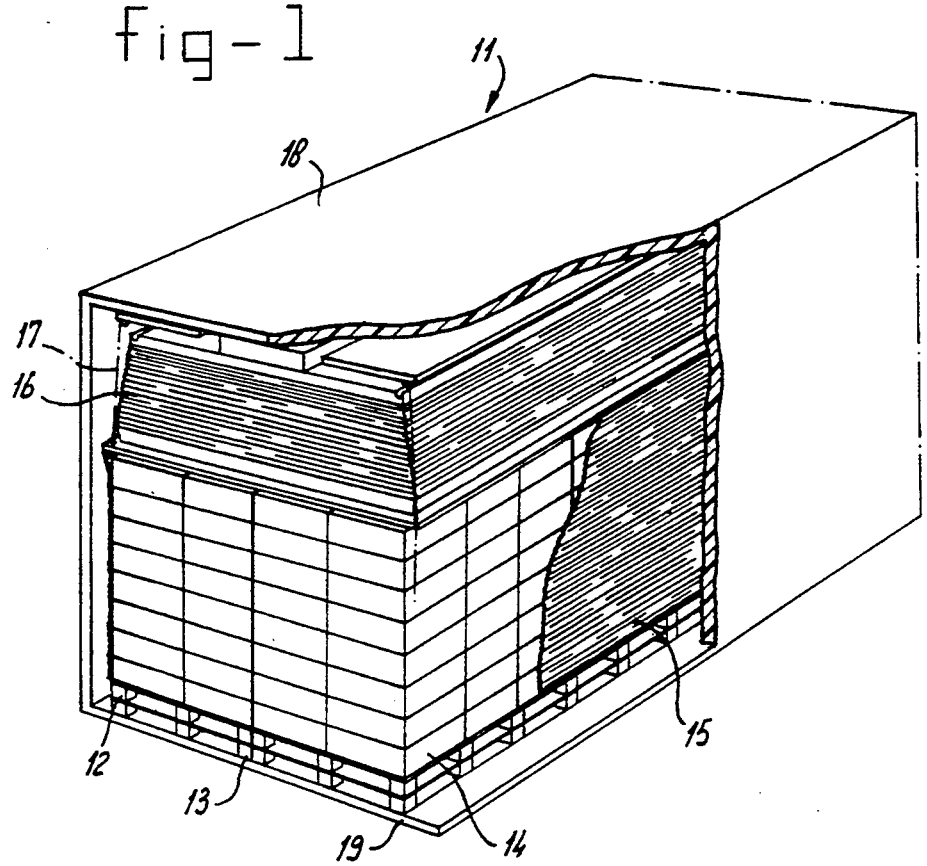
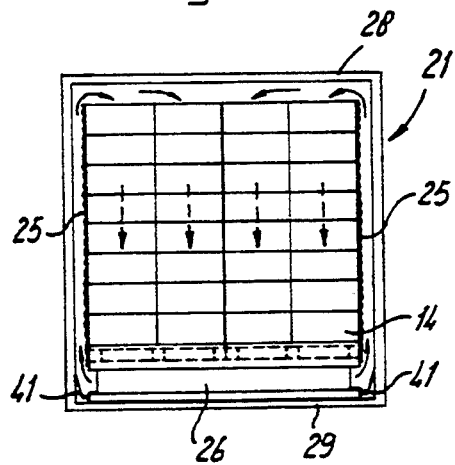
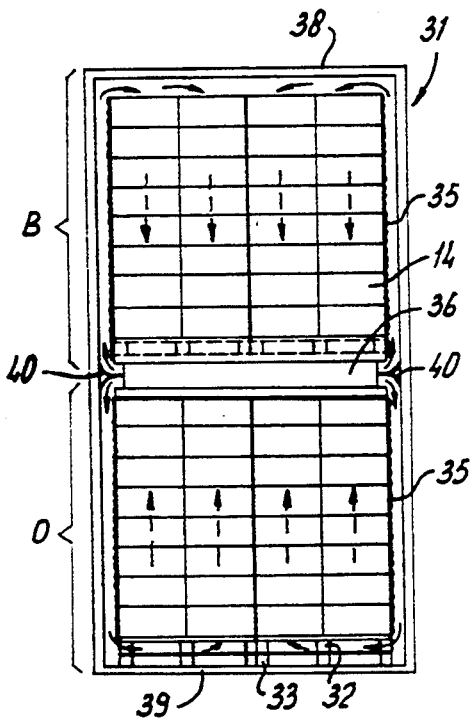

DEVICE FOR RIPENING FRUIT

BACKGROUND OF THE INVENTION

The present invention relates to a method for ripening fruit, such as bananas, in which a fluid is cooled and guided along the fruit by circulation means conveying said fluid through a load of fruit placed on a pallet.

Such a method is known from U.S. Pat. No. 4,824,685. In the case of this method two rows of pallets, each stacked two loaded pallets high, are placed parallel to each other in a chamber. Spaces are produced between the individual stacked rows and between the stacked rows and the longitudinal side walls of the chambers. The stacked rows are placed with one end against a false rear wall of the chamber, and a space is left between the false rear wall of the chamber and the outside rear wall of the chamber. The top side of the stacks is sealed off by an element which also seals off the space between the stacks, and the other end of the stacks is sealed off in an identical way. Air is sucked off out of the space between the stacks through holes in the false rear wall which open out into the space between the stacks, and said air is cooled and blown out above the stacks. The air flows into the spaces between the stacks and the longitudinal side walls of the chamber, and then in the horizontal direction along the fruit packed in boxes and loaded onto pallets to the space between the stacks.

This known device has the great disadvantage that air flows very unevenly through the boxes full of fruit on the pallets. The flow of air through the boxes is much better close to the Fear wall than at the other end of the rows. This results in uneven ripening of the fruit. Furthermore, owing to the fact that the flow decreases as the distance from the rear wall increases, it is not possible in practice to make the rows of pallets of unlimited length.

SUMMARY OF THE INVENTION

An object of the present invention is to provide a method which does not have these disadvantages.

This object is achieved in the case of the method according to the invention through the fact that the load is sealed essentially in an airtight manner in the peripheral direction, that the load is placed above or below the circulation means, and that the fluid is conveyed through the load essentially in the vertical direction by the circulation means. Sealing the load in an airtight manner in the peripheral direction means that the fluid can flow only in the vertical direction through the load; and by placing the circulation means directly against the bottom side or top side of the load, there is a much more uniform flow of fluid through the load. The method according to the invention is preferably carried out in a sealable, insulated (ripening) chamber.

According to the invention, a very uniform ripening can be achieved if the circulation means suck the fluid up through the load from the bottom or down through the load from the top, and then guide it along the cooling means, following which, as the result of a pressure difference caused by the circulation means, the fluid is conveyed again along the outside of the load to the bottom or top side, respectively, thereof. The suction of the fluid produces an advantageous, essentially vertical flow thereof, while the fluid can be cooled effectively when it leaves the load again. Furthermore, by sucking an airtight sealing material around the load will be sucked against the load. This effect prevents stray fluid streams between the load and the sealing material. For a good sealing effect, a flexible sealing material is advisable.

According to the invention, it is also advantageous if condensate is collected at the bottom of the load and then discharged. An important aspect in the ripening of, inter alia, bananas is maintaining the highest possible relative humidity in the ripening chamber, in order to prevent moisture loss from the fruit. This means that the fluid being circulated through the chamber easily becomes saturated. The condensate entrained with the fluid is, however, readily absorbed by the cardboard boxes in which the fruit is generally packed, with the result that the boxes lose their strength. In order to counteract this, it is important to collect precipitated condensate and discharge it. In this case it is advantageous for the floor of the ripening chamber to be used for collecting the condensate.

According to an advantageous method according to the invention, a number of pallets containing loads of fruit are placed in a block, i.e. against one another and/or on top of one another. This is possible in the case of the method according to the invention due to the fact that the uniformity of the flow in this case in principle does not depend on the length of row of the pallets because the direction of flow is vertical, and does not depend on the height of the stack because a circulation device can be position vertically adjacent every pallet.

The invention also relates to a device for ripening fruit, such as bananas, loaded onto a pallet, comprising separating means for separating two spaces from each other and circulation means which convey the fluid from one space to the other and produce a pressure difference through which the fluid flows back from said other space said one space. According to the invention, at least one pallet loaded with fruit can be accommodated in said one space, and the separating means seal off said one space from said other space in such a way that the circulation means, which can be placed from above on the load of a pallet or from below against a pallet, convey the fluid essentially in the vertical direction through said one space. If an airtight partition is placed around the load, preferably being placed against the load, the fruit is placed in a space through which air flows in the vertical direction when the circulation means are placed below or above the load. In this case a side wall of the ripening chamber in which the device is placed can Form part of the partition. Such a device has the advantages of the abovementioned method according to the invention, and it can also be built relatively easily into an existing ripening chamber, as a replacement for a device which is not so good for ripening fruit.

It is advantageous according to the invention if the circulation means comprise a suction hood which can be connected by its suction side in an airtight manner to the separating means. A uniform fluid flow can be obtained throughout the load by using a suitable shape of suction hood. The airtight connection means that stray fluid flows are prevented, and it is possible to place the load of fruit above or below the suction hood first and then fit the separating means and fix them in a sealing manner to the suction hood.

Such devices comprise cooling means for cooling of a fluid. It is advantageous here according to the invention if the cooling and circulation means form one unit. Efficient cooling of the fluid is achieved in this way.

According to an advantageous embodiment of the invention, the separating means comprise an airtight sheet which can be fitted in the peripheral direction around at least a part of the one space. Such a separating means is very simple in design, and is easy to fit. Such a sheet can be made of many materials. The sheet could be, for example, a plastic Film or an airtight fabric. When the load is placed against, example, the Fear wall of the ripening chamber, such a sheet needs only be provided over the remainder of the periphery.

According to another advantageous embodiment of the invention, the separating means comprise a horizontally or vertically movable curtain. Such a curtain must, of course, be airtight and could be automatically closed around the load, if desired.

According to a further advantageous embodiment of the invention, the curtain is a accordion-type construction. Depending on its fixing point, such a curtain can, for example, easily be pulled up or down around the load, thus sealing off the load all the way round.

According to another advantageous embodiment of the invention, the separating means comprise a panel. If a number of panels are placed around the load, an airtight partition can be achieved in a simple way.

Known devices generally comprise a frame for supporting the loaded pallets. According to the invention, it is advantageous if such a frame provides for a space below the loaded pallet. If the circulation means are provided on top of the load, such a space promotes a good fluid flow through the load. Such a space also makes it possible to place the circulation means below the load.

In the case of a device for ripening loads of fruit on two adjacent rows of pallets placed essentially parallel to each other, it is advantageous according to the invention if the rows are placed against each other in the lengthwise direction, and if the circulation means comprise at least one fan for every two adjacent pallets of different rows. This is an efficient way of achieving a uniform vertical flow through the load. It is further improved if the circulation means also comprise a suction hood for every two adjacent pallets of different rows. In this way it is also possible for a device according to the invention which is designed for, for example, two rows ten pallets long still to work well if the rows each contain only five loaded pallets. This working with an incomplete load can be improved further by, for example, making the circulation means operate separately for each suction hood and providing an additional separating means which is placed against the end of the short row. It is also conceivable for the device to comprise a suction hood for each pallet.

For reasons mentioned earlier, it is advantageous according to the invention if the device also comprises a collection and/or discharge device for condensate, preferably provided at the bottom of the one space. The collection device for the condensate can be formed here by, for example, the floor of the one space, or by drains provided in this floor.

A device according to the invention is relatively cheap and easy to install in a ripening chamber. In this way, ripening chambers not operating entirely satisfactorily can be converted relatively cheaply to ripening chambers which operate better. If devices according to the invention are built into ripening chambers, for example existing conventional ripening chambers, it is advantageous according to the invention if the circulation means and/or separating means are fixed to the ceiling of the chamber, in which case they are then preferably fixed in such a way that they are movable in the vertical direction. During loading of the chamber these circulation and/or separating means can then be, for example, raised so that the loaded pallets can be placed below them, following which the means in question can be lowered again, and the separating means can be put in place, for example by lowering a horizontally movable curtain.

In the case of a device comprising s frame in which at least two loaded pallets are placed one above the other, it is very advantageous according to the invention if between the loads of two loaded pallets placed one above the other the frame provides for a space in which the cooling and ventilation means are disposed. This prevents excessive temperature differences from occurring in the load on the pallets as a result of the longer distance.

A great advantage of the present invention is that, when used in a conventional ripening chamber, much more pallets loaded with fruit can be ripened at the same time, as the pallets loaded with fruit can be placed in a block without interstitial places. As the costs for the arrangements required for applying the present invention can be low, the present invention is also very advantageously usable for reconstructioning conventional old economic ripening chambers.

BRIEF DESCRIPTION OF THE DRAWINGS

The invention will now be explained in greater detail below with reference to a drawing with three examples of embodiments. In the drawing:

FIG. 1 shows a partially cut-away view in perspective of a device according to the invention built into a ripening chamber;

FIG. 2 shows a diagrammatic vertical cross-section of another embodiment of the invention; and FIG. 3 shows a diagrammatic vertical cross-section of yet another embodiment of the invention.

DETAILED DESCRIPTION OF THE EMBODIMENTS

FIG. 1 shows a partially cut-away view in perspective of a ripening chamber 11, in which s device according to the invention is disposed, and in which pallets 12 loaded with boxes 14 of fruit are placed. As shown in FIG. 1, the loaded pallets 12 can be placed by means of a frame 13 at some height above the floor 19 of the chamber 11, but this is not always necessary for a good flow below the pallets 12 of the air to be circulated. It has been found in practice that this is not essential in certain circumstances. A partition, resting against the boxes 14 loaded onto the pallets 12, is placed all around said boxes 14, which are at least partially open at the top and bottom. Said partition admits no air and along its top side is fixed in an airtight manner to the suction hood 16. This suction hood is suspended by cables 17 from the ceiling 18 of the ripening chamber, and can move back and forth in the vertical direction in order to facilitate loading and unloading of loaded pallets. All partitions 15 are preferably placed at some distance from the side walls of the chamber 11, so that air can flow all around the load covered by the partitions.

FIGS. 2 and 3 show cross-sections of other embodiments of a device according to the invention placed in a filled ripening chamber. Reference numbers corresponding to those in FIG. 1 are increased by 10 in FIG. 2 and by 20 in FIG. 3 relative to those in FIG. 1.

FIGS. 2 and 3 have arrows indicating the direction of the fluid flows.

FIG. 2 shows a device in which the suction hood 26 is placed on the floor 29 of the ripening chamber 21. The pallets on which the boxes 14 stand are in this case recessed in the suction hood 26, and are therefore not visible. The air is sucked down through the load from the top by circulation means, such as fans, placed in the suction hood 26, in the course of which heat given off by the ripening fruit is entrained, following which the air in the suction hood 26 is cooled by cooling means, and is blown out again at the sides of the suction hood 26. As the result of a pressure difference caused by the circulation means, this circulation of air continues, and the air which has been blown out flows up again between the side walls of the chamber 21 and the partitions provided The embodiment of a device according to the invention shown in FIG. 2 has the great advantage that, if the air to be cooled has a high humidity and during cooling the dew point temperature appropriate to that humidity is passed condensate which occurs during cooling largely precipitates before the air rises again in the chamber. This prevents the generally cardboard boxes in which the fruit is packed from losing their stiffness through the absorption of moisture. This condensate is collected in and drained away through drains 41. These drains 41 can also be omitted, in which case the condensate is then drained off along the floor of the ripening chamber. These features make this embodiment according to FIG. 2 very suitable for use in very moist and/or warm climates. For, the problem occurring here is that when the ripening chamber is opened, for example for inspection of the fruit, the ripening chamber is filled with warmer, very moist air, with the result that large quantities of condensate are formed during the cooling thereof.

FIG. 3 shows a third embodiment of a device according to the invention. In the case of this device the loaded pallets are stacked on top of one another, with between them a suction hood 36 which sucks air both downwards and upwards. The air flows in the top part B of the chamber 31 are the same as those in FIG. 2, while the air flows in the bottom part 0 are the mirror image thereof (with the suction hood 36 as the mirror surface). For the rest, this device works approximately in the same way as that of FIG. 2. Intermediate pieces 40, which guide the air discharged from the suction hood upwards and downwards, are also shown in FIG. 3.

A device of the type shown in FIG. 3, in the case of which a suction hood is provided between pallet loads, is very suitable if there is little floor surface available, and the pallet stacks therefore have to be higher. The temperature difference between the fruit at the top of the stack and at the bottom of the stack is kept smaller in this case, which makes more uniform ripening possible.

The directions of flow of the circulating air in the device according to FIG. 1 are the same as those in the bottom part 0 of the chamber in FIG. 3.

It is pointed out that the fluid is preferably air, but that other fluids are conceivable. Many variations and modifications are also possible within the scope of the invention, for example:

The separating means can be formed by, for example, a plastic film which is wound per pallet around the load placed on each pallet. No additional sealing means, such as curtains and panels, need then be placed around the block of pallets loaded with fruit. It is also conceivable to make the side walls of the boxes in which the fruit is packed completely airtight, thereby achieving a similar effect.

A wall of the ripening chamber, for example the rear wall thereof, can form part of the separating means, sealing off one space from the other, if the block of pallets loaded with fruit is placed against said wall.

In the case of the embodiment shown in, for example, FIG. 2 it is also possible for the frame to be such that it provides a false floor at the bottom of the ripening chamber, under which the cooling and circulation means are situated, and in the case passages are provided for making the fluid flow along the outside of the partitions 25 again.

We claim:
1. A device for ripening fruit loaded onto a pallet located inside an airtight ripening chamber said device having a ceiling and comprising:
   a) an airflow separating means to separate said ripening chamber into an interior airflow space to accommodate said loaded pallet and an exterior airflow space, said exterior space extending around said interior space in heat-exchanging relationship therewith;
   b) an air circulation mechanism positionable above said load or beneath said pallet and having a suction hood connectable in an airtight manner to said airflow separating means to circulate air or other gaseous fluid and create a vertical pressure differential within each said separate space of said chamber to cause a vertical air flow in each of said interior and exterior airflow spaces, said vertical air flows being in opposing directions.

2. A device according to claim 1, further comprising a cooling mechanism to cool circulating air wherein said air circulation mechanism and said air cooling mechanism are comprised in one mechanical unit.

3. A device according to claim 1, for ripening fruit loaded on two adjacent, essentially parallel rows of pallets arranged in pairs and located inside said airtight ripening chamber, wherein said device comprises at least one fan for every two pallets of different rows.

4. A device according to claim 2, wherein said circulation means comprises a suction hood for each said pair of pallets.

5. A device according to claim 1, wherein said interior vertical flow is in a downward direction and said device further comprises a condensate collection and discharge device disposed near the bottom of each said interior space of said chamber to collect and discharge condensate from the circulated cooled air.

6. A device according to claim 1, wherein said circulation mechanism is supported from said ceiling of said chamber to facilitate positioning said circulation mechanism above said load or beneath said pallet.

7. A device according to claim 6, wherein said circulation mechanism is movable in a vertical direction.

8. A device according to claim 1, wherein said airflow separating means is attached to said ceiling of said ripening chamber.

9. A device according to claim 8, wherein said airflow separating means is movable in a vertical direction.

10. A device according to claim 8, wherein said fruit is loaded into boxes on said pallet and said separating means comprises a loose, flexible curtain drawable into snug engagement with said boxes upon operation of said circulation mechanism.

11. A device according to claim 1, wherein air flowing through said interior space exchanges heat with air flowing through said exterior space to promote even temperature distribution and uniform ripening within said chamber.

12. A device for ripening fruit loaded on at least one pallet located inside an airtight ripening chamber, said device having a ceiling and comprising:
   a) an airflow separating means to separate said ripening chamber into an interior airflow space to accommodate said loaded pallet and an exterior airflow space;
   b) an air circulation mechanism connected to said ceiling of said ripening chamber to circulate air or other gaseous fluid and to create a vertical pressure differential within each said separate space of said chamber, and cause a vertical air flow in each of said interior and exterior airflow spaces, said vertical air flows being in opposing directions; and
   c) a support means to support said air circulation mechanism from said ceiling for vertical movement to facilitate assembly of said device with at least one said pallet.

13. A device according to claim 12, further comprising a cooling mechanism to cool circulating air wherein said air circulation mechanism and said air cooling mechanism are comprised in one mechanical unit.

14. A device according to claim 12, for ripening fruit loaded on two adjacent, essentially parallel rows of pallets arranged in pairs and located inside said airtight ripening chamber, wherein said device comprises at least one fan for every two pallets of different rows.

15. A device according to claim 14, wherein said pallets are loaded with boxes of said fruit and said circulation means comprises a suction hood for each said pair of pallets said suction hood being sealable with said airflow separation means in an airtight manner and being positionable above or beneath said load.

16. A device according to claim 12, wherein said interior vertical flow is in a downward direction and said device further comprises a condensate collection and discharge device disposed near the bottom of each said interior space of said chamber to collect and discharge condensate from the circulated cooled air.

17. A device according to claim 12, wherein said airflow separating means is attached to said ceiling of said ripening chamber.

18. A device according to claim 17, wherein said airflow separating means is movable in a vertical direction.

19. A device according to claim 12, wherein said separating means comprises a loose, flexible curtain drawable into snug engagement with said boxes by operation of said circulation mechanism.

20. A device according to claim 12, wherein air flowing through said interior space exchanges heat with air flowing through said exterior space to promote even temperature distribution and uniform ripening within said chamber.

21. A device according to claim 12, wherein said air circulation means comprise a suction hood connectable in an airtight manner to said airflow separating means.

22. A device for ripening fruit loaded on at least one pallet located inside an airtight ripening chamber, said device having a ceiling and comprising:
   a) an airflow separating means to separate said ripening chamber into an interior airflow space to accommodate said loaded pallet and an exterior airflow space; and
   b) an air circulation mechanism connected to said ceiling of said ripening chamber to circulate air or other gaseous fluid and to create a vertical pressure differential within each said separate space of said chamber, and cause a vertical air flow in each of said interior and exterior airflow spaces, said vertical air flows being in opposing directions;
wherein said separating means comprises a loose, flexible curtain drawable into snug engagement with said boxes upon operation of said circulation mechanism.

23. A device according to claim 12, wherein said interior vertical flow is in a downward direction, wherein air flowing through said interior space exchanges heat with air flowing through said exterior space to promote even temperature distribution and uniform ripening within said chamber, said airflow separating means is attached to said ceiling of said ripening chamber and is movable in a vertical direction, and wherein said device further comprises:
   c) a condensate collection and discharge device disposed near the bottom of each said interior space of said chamber to collect and discharge condensate from the circulated cooled air; and
   d) a suction hood connectable in an airtight manner to said airflow separating means.

24. A device for ripening fruit loaded onto a pallet located inside an airtight ripening chamber said device having a ceiling and comprising:
   a) an airflow separating means to separate said ripening chamber into an interior airflow space to accommodate said loaded pallet and an exterior airflow space, said exterior space extending around and substantially embracing said interior space in heat-exchanging relationship therewith; and
   b) an air circulation mechanism positionable above said load or beneath said pallet and having a suction hood connectable in an airtight manner to said airflow separating means to circulate air or other gaseous fluid and create a vertical pressure differential within each said separate space of said chamber to cause a vertical air flow in each of said interior and exterior airflow spaces, said vertical air flows being in opposing directions;
whereby air flowing through said interior space exchanges heat with air flowing through said exterior space to promote even temperature distribution and uniform ripening within said chamber.

* * * * *